US009826056B2

(12) United States Patent
Deeter et al.

(10) Patent No.: US 9,826,056 B2
(45) Date of Patent: Nov. 21, 2017

(54) DISPLAYING NEWS TICKER CONTENT BASED ON DIVERSITY IN A SOCIAL NETWORKING SYSTEM

(71) Applicants: Ken Deeter, San Francisco, CA (US); Robert William Cathcart, San Francisco, CA (US)

(72) Inventors: Ken Deeter, San Francisco, CA (US); Robert William Cathcart, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 101 days.

(21) Appl. No.: 13/709,001

(22) Filed: Dec. 9, 2012

(65) Prior Publication Data
US 2014/0164503 A1    Jun. 12, 2014

(51) Int. Cl.
*G06F 15/16* (2006.01)
*H04L 29/08* (2006.01)
*H04L 12/18* (2006.01)

(52) U.S. Cl.
CPC ............ *H04L 67/306* (2013.01); *H04L 67/26* (2013.01); *H04L 12/1831* (2013.01)

(58) Field of Classification Search
CPC ....... H04L 67/26; H04L 67/306; H04L 67/22; H04L 12/51; H04L 12/1831; G06F 17/30867
USPC ......................................................... 709/204
See application file for complete search history.

(56) References Cited

U.S. PATENT DOCUMENTS

| | | | |
|---|---|---|---|
| 7,669,123 B2* | 2/2010 | Zuckerberg et al. ......... | 715/273 |
| 8,214,749 B2 | 7/2012 | Feinberg et al. | |
| 8,327,012 B1 | 12/2012 | Nguyen et al. | |
| 8,352,573 B2 | 1/2013 | Chandra | |
| 8,732,240 B1 | 5/2014 | Tomkins et al. | |
| 9,146,656 B1 | 9/2015 | Srinivasan et al. | |
| 9,503,411 B1 | 11/2016 | Lin et al. | |
| 2007/0157119 A1 | 7/2007 | Bishop | |
| 2007/0174389 A1* | 7/2007 | Armstrong ........ | G06F 17/30867 709/204 |
| 2008/0040673 A1* | 2/2008 | Zuckerberg et al. ......... | 715/745 |
| 2009/0158200 A1 | 6/2009 | Palahnuk et al. | |
| 2009/0217196 A1 | 8/2009 | Neff et al. | |
| 2009/0307003 A1 | 12/2009 | Benyamin et al. | |
| 2010/0023871 A1* | 1/2010 | Bederson et al. ............ | 715/745 |
| 2010/0088314 A1* | 4/2010 | Kuang .............. | G06F 17/30864 707/733 |
| 2010/0228558 A1 | 9/2010 | Corcoran et al. | |
| 2011/0153412 A1* | 6/2011 | Novikov et al. ........... | 705/14.42 |

(Continued)

*Primary Examiner* — Dhairya A Patel
(74) *Attorney, Agent, or Firm* — Fenwick & West LLP

(57) ABSTRACT

A social networking system displays stories describing actions to a user in a news ticker. The stories may be selected so that a variety of types of stories, stories associated with a variety of users, or stories associated with a variety of actions are presented via the news ticker. Additionally, stories having a common characteristic, such as being associated with a common user, may be aggregated and a description of the aggregated stories is presented in the news ticker. For example, stories aggregated based on acting user may identify the user common to the stories and a description of the aggregated stories may be displayed. Further, the value to the social networking system of displaying different types of content may be used to modify how different types of content are displayed in the news ticker.

17 Claims, 9 Drawing Sheets

(56) References Cited

U.S. PATENT DOCUMENTS

| | | |
|---|---|---|
| 2011/0166941 A1 | 7/2011 | Sutton-Shearer |
| 2011/0231240 A1* | 9/2011 | Schoen .............. G06Q 30/0242 |
| | | 705/14.41 |
| 2011/0258049 A1* | 10/2011 | Ramer et al. .............. 705/14.66 |
| 2011/0276396 A1 | 11/2011 | Rathod |
| 2012/0066340 A1 | 3/2012 | Armstrong et al. |
| 2012/0131441 A1 | 5/2012 | Jitkoff et al. |
| 2012/0150772 A1* | 6/2012 | Paek ...................... G06N 5/025 |
| | | 706/12 |
| 2012/0150970 A1 | 6/2012 | Peterson et al. |
| 2012/0210253 A1 | 8/2012 | Luna et al. |
| 2012/0272160 A1 | 10/2012 | Spivack et al. |
| 2013/0013404 A1 | 1/2013 | Suprock et al. |
| 2013/0036109 A1 | 2/2013 | Kulick et al. |
| 2013/0061156 A1* | 3/2013 | Olsen et al. .................. 715/753 |
| 2013/0061296 A1* | 3/2013 | Reddy ..................... H04L 51/02 |
| | | 726/5 |
| 2013/0072233 A1* | 3/2013 | Sandholm .................. 455/456.3 |
| 2013/0086078 A1* | 4/2013 | Malleshaiah .......... G06Q 30/02 |
| | | 707/748 |
| 2013/0151611 A1* | 6/2013 | Graham et al. ............... 709/204 |
| 2013/0151661 A1 | 6/2013 | Koponen et al. |
| 2013/0211925 A1 | 8/2013 | Holland |
| 2013/0275519 A1 | 10/2013 | Nichols |
| 2013/0304822 A1* | 11/2013 | Tetreault ....................... 709/204 |
| 2014/0040370 A1* | 2/2014 | Buhr ..................... H04L 67/306 |
| | | 709/204 |
| 2014/0089099 A1 | 3/2014 | Money |
| 2014/0100943 A1* | 4/2014 | Palihapitiya ....... G06Q 30/0251 |
| | | 705/14.39 |
| 2016/0004761 A1 | 1/2016 | Zhang |

\* cited by examiner

DISPLAYING NEWS TICKER CONTENT BASED ON DIVERSITY IN A SOCIAL NETWORKING SYSTEM

BACKGROUND

This invention relates generally to social networking systems, and in particular to presenting actions performed by users within a social networking system via a ticker interface.

A social networking system typically has access to large amounts of social information describing actions performed by users that may be of interest to other social networking system users. A user is likely to be interested in being notified of actions performed by other users connected to the user in the social networking system. Examples of actions include: photo uploads, status updates, transactions, wall posts, comments, recommendations, and likes of other users' photos, videos, and the like. The social networking system stores other types of information that is likely to be of interest to a user, for example, activities related to social groups or events represented in the social networking system.

Commonly, a social networking system notifies a user of actions performed by other users using news stories, or "stories," describing an action performed and a user performing the action. While a social networking system often selects news stories for presentation to a user based on various factors indicting the user's likely interest in an action and/or a user associated with a story, inaccuracies may arise in the story selection. However, notifying a user of each action performed by other users connected to the user may result in the display of stories describing actions performed by a small number of users or describing a small number of types of actions. For instance, if a user successively establishes connections to other users, a real-time display of stories to an additional user connected to the user may predominantly include stories describing the connections made by the user, which may not be relevant to the additional user. Further, displaying stories to a user in real-time may result in the user receiving an increased amount of content that is less relevant to the user.

SUMMARY

Stories describing actions taken by social networking system users may be organized and displayed by a news ticker presented through the social networking system. A story describes an action taken by a social networking system user connected to a target user that views the news ticker. A news ticker may be initially populated with stories and may be updated as user actions are subsequently logged by the social networking system. Actions performed by users connected to the target user viewing the news ticker are used to retrieve candidate stories, and stories are selected from the candidate stories for presentation by the news ticker based on several factors, including the stories currently presented by the news ticker.

For example, diversity criteria may be used to select stories from the candidate stories. The diversity criteria allow the news ticker to provide the target user with a variety of content. For example, stories are selected from the candidate stories so that the news ticker includes a threshold number of different story types, which are associated with stories, or so that the news ticker includes a threshold number of a specific story type. As another example, diversity criteria are used to select candidate stories so the news ticker includes stories associated with a threshold number of different users or so the news ticker includes stories associated with users for which the target user has at least a threshold affinity. Similarly, diversity criteria may cause selection of candidate stories so the news ticker includes stories describing a threshold number of different actions or describing a threshold number of actions having a specific type Selection of candidate stories may also account for the target user's likelihood to be interested in the candidate stories. For example, the target user's affinities for users associated with each of the candidate stories are determined and used to select candidate stories. For example, candidate stories associated with users for which the target user has at least a threshold affinity or for which the target user has the highest affinities are selected. The time associated with an action described by a candidate story may also be a factor in selecting a candidate story. For example, candidate stories describing actions associated with times within a threshold time of a current time are selected. Combinations of factors may be used to select candidate stories. For example, candidate stories describing actions associated with times within a threshold time and associated with users for which the target user has at least a threshold affinity are selected.

Additionally, an aggregated representation of multiple stories having a common characteristic may be generated and displayed by the news ticker. For example, candidate stories associated with a selected user are identified and an aggregated representation identifying the selected user and the number of stories aggregated is generated and presented via the news ticker. In one embodiment, subsets of candidate stories having a common characteristic (e.g., story type, user, action) are generated, and an aggregated representation of each subset is generated. The aggregated representation of each subset may identify the characteristic common to candidate stories in the subset and also provide information about the subset (e.g., number of candidate stories included in the subset, number of users associated with stories in the subset, number of action types included in the subset, etc.). A target user may obtain additional information about candidate stories in a subset by interacting with the aggregated representation of the subset via the news ticker.

The social networking system may determine a value to the social networking system of displaying different types of content via the news ticker. Characteristics of the target user viewing the news ticker may be used to determine the value of displaying different types of content. Examples of characteristics of the target user for determining values of displaying different types of content include: biographic characteristics, geographic characteristics, interests, the characteristics of additional users connected to the target user, and a context of the target user within or external to the social networking system. Additionally, characteristics of the target user may be compared to one or more value criteria with the types of content presented to the target user, or the value of presenting types of content to the target user, based on whether the target user's characteristics satisfy one or more of the value criteria. Examples of types of content include: stories, advertisements, surveys, questions, recommendations, and any other type of content for presentation to a target user.

For example, revenue generated by presenting advertisements is determined based on the target user's interactions with the social networking system, the number of users connected to the target user, or any other suitable information. As another example, the value of information obtained from the social networking system when stories or surveys are presented is determined. The values for presenting different types of content may be converted to a common unit of measurement. Based on the determined values, types of content are selected for presentation to the user. In one embodiment, different types of content are presented in different portions of the news ticker. The size of the portions of the news ticker may be based on the value of the types of content displayed in the different portions. For example, types of content having higher values are displayed in larger portions of the news ticker.

BRIEF DESCRIPTION OF THE DRAWINGS

FIG. 3b is an example social networking system user interface displaying a news ticker including aggregated representations of multiple stories, according to one embodiment.

FIG. 4 is an example social networking system user interface presenting different types of content in a news ticker, according to one embodiment.

Figure 1:
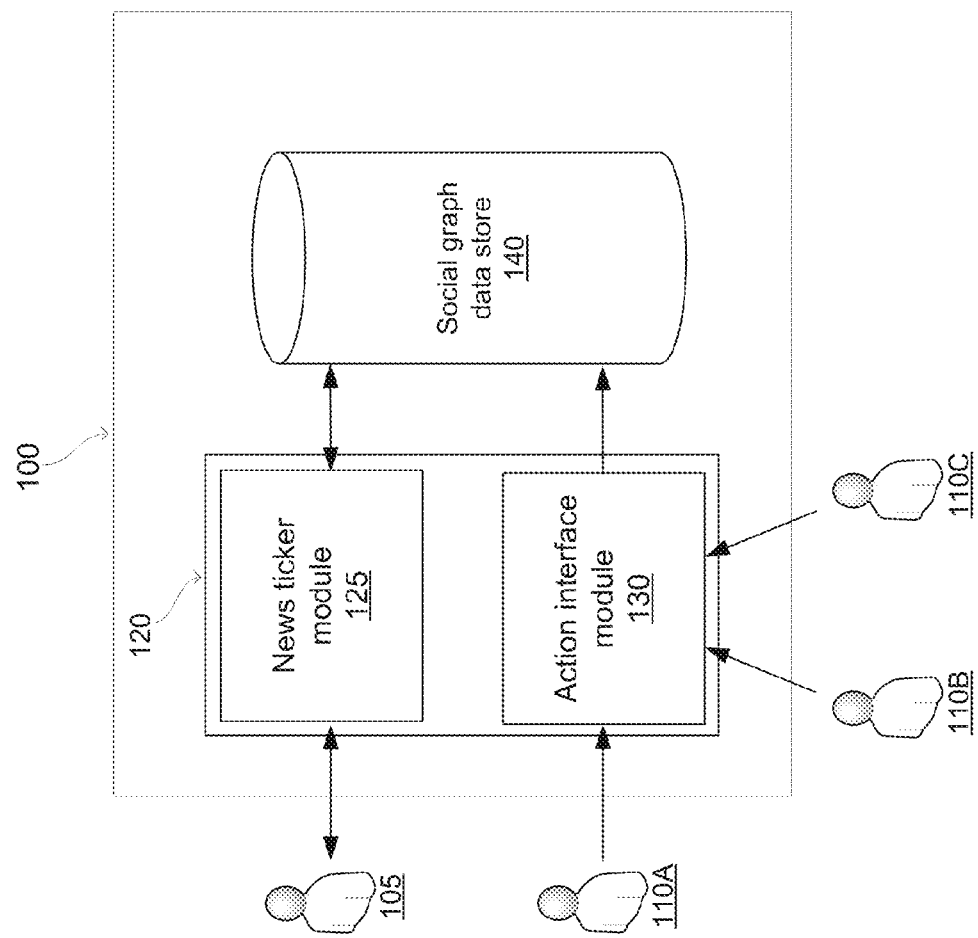
FIG. 1 is a diagram illustrating the creation and display of news stories in a social networking system ticker, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Social Networking System Overview

A social networking system allows its users to communicate and interact with each other. Users of the social networking system provide information about themselves to the social networking system and establish connections to other social networking system users. Additionally, users may provide content to the social networking system that may be shared with other users. The social networking system may maintain objects describing content provided by users, or otherwise maintained by the social networking system, and allow users to perform actions involving the objects. Examples of objects may also include pages providing information about a concept, user or entity, groups of users, events, or other data. Additionally, social networking system users may perform actions involving other users or objects.

Social networking system users may to associate themselves with, establish connections with, and interact with other users. When two users establish a connection, they become "connected" (or become "friends") within the context of the social networking system. Being connected in a social networking system allows users access to more information about each other than would otherwise be available to unconnected users. For instance, being connected to another user allows a user to view a profile page of the other user, to see the other user's friends, or to view actions taken within the social networking system by the other user. Additionally, being connected allows a user greater ability to interact with another user to which the user is connected. For example, connected users may have greater access to communicate with each other, to communicate about another user, to share objects and other information with each other, to comment on objects associated with each other, or other similar actions. A social networking system may allow a user to establish a variety of types of connections with another user. For example, users can establish various personal or non-personal connections with another user in a social networking system. Examples of personal connections include: a friendship, a romantic relationship, or a familial relationship. Examples of non-personal relationships include: employee, employer, co-worker, student, teacher, or any other suitable relationship. Information describing connections may also be maintained by the social networking system, such as anniversaries or other relationship milestones.

Using information associated with users, information associated with objects, actions performed by users, and connections between users and other users and/or objects, the social networking system maintains a social graph. Hence, a node represents an object maintained by the social networking system that may act or may be acted upon by another object. In one embodiment, the social graph comprises a plurality of nodes representing objects and/or users. The nodes are connected by edges representing actions, connections, communications, or other indications of relatedness between nodes. Thus, an edge between nodes represents any kind of connection or interaction between the nodes. Edges are created in the social graph as a result of an action performed by an object corresponding to a node on another object corresponding to another node.

Edges in the social graph may be associated with affinity scores representing the importance, strength, or relevance of connections between objects. The affinity scores may be referred to as "affinities" or "coefficients." The affinity associated with an edge may be represented in any suitable format such as numeric weights, non-numeric weights (high, medium, low, etc.), Boolean weights, and the like. In one embodiment, a connection type associated with an edge affects the affinity associated with the edge. For example, family relationships between users may be more relevant than co-worker relationships between users; accordingly, edges representing family connections may be associated with a higher affinity relative to edges representing co-worker connections. As another example, edges representing a user joining a group may have a higher affinity than edges representing the posting of a message to the group's wall by a user not included in the group.

Affinities may be used to infer the relevance of an object to another object. For example, if a first user (represented by a first node) is connected to a second user (represented by a second node) with an edge associated with a high affinity and is also connected to a third user (represented by a third node) with an edge associated with a lower affinity, an action taken by the second user may be inferred to be more relevant to the first user than an action taken by the third user. Nodes may be connected by multiple edges. For example two users may be connected by an edge representing a familial relationship, an edge representing a tagging of a user in a photograph by the other user, another edge representing a message from a user to the other user, and so forth. If multiple edges connect two nodes, a combination of the affinities associated with each node may be used to infer the relevance of the objects corresponding to the connected nodes. For example, the average, weighted average, sum, weighted sum, or other combination of the affinities associated with the edges may be used to make inferences about the relevance of the objects corresponding to nodes connected to each other by multiple edges. For simplicity, discussion of inferring relevance between objects herein refers to a single affinity associated with an edge between nodes representing the objects, although this single affinity may represent the combination of multiple affinities associated with multiple edges between nodes.

An object maintained by the social networking system may be a user, a content item, a group, a social networking system page, a location, an application, an event, or any other information maintained by the social networking system. A content item is anything that a user or other object creates, uploads, edits or interacts with. Examples of content items include: messages, queued messages (e.g., email), text and SMS (short message service) messages, comment messages, messages sent using any other suitable messaging technique, hypertext transfer protocol (HTTP) links, hypertext markup language (HTML) files, images, videos, audio clips, documents, calendar entries, events, or other suitable information.

A social networking system allows its users to communicate both internal to and external to the social networking system. For example, a first user can send a second user a message, an email, an instant message, a voice call, or a video chat call within the social networking system. Communications originating within the social networking system may also transmitted external to the social networking system, for example, an email may be generated within the social networking system and sent to a user's personal email account. Similarly, communications may originate outside of the social networking system and be communicated to a user within the social networking system, for example, an instant message may be generated from a third-party application and transmitted to an instant messaging interface internal to the social networking system.

The social networking system allows its users to perform a variety of actions inside and outside of the social networking system. These actions are tracked and stored, allowing the social networking system to maintain a record of actions performed by its users. Stored actions associated with a user may be used to select content for presentation to the user, to generate suggestions for additional actions for the user, or to otherwise provide information to the user. Examples of interactions between users and objects that may be recorded include: commenting on content posted by another user, posting content to the social networking system, sharing links with other users, associating a user with a photograph or with other content, sending a message to another user, or joining a group of users. Additional examples of interactions with objects on the social networking system include: commenting on a photo album, expressing a preference for content (i.e., "liking" content), expressing a preference for a page (e.g., "liking" the page or "becoming a fan" of the page), creating an event, joining an event, playing media content, authorizing an application, using an application, engaging in a transaction, or other suitable interaction.

The social networking system may also store actions taken by users on systems external to the social networking system. For example, an e-commerce website that primarily sells sporting equipment at bargain prices may recognize a user of a social networking system through social plug-ins that enable the e-commerce website, or another external website, to identify the user of the social networking system. Because users of the social networking system are uniquely identifiable, e-commerce websites, such as this sporting equipment retailer, may use the information about these users as they visit their websites. Hence, the social networking system may store data about these users and their actions outside of the social networking system, including webpage viewing histories, advertisements that were engaged, purchases made, and other patterns from shopping and buying.

News Ticker Overview

FIG. 1 is a diagram of one embodiment of the creation and display of news stories in a news ticker of a social networking system. As shown in FIG. 1, a social networking system 100 includes a social networking system graphical user interface (GUI) 120 and a social data store 140. The social networking system GUI 120 includes a news ticker module 125, an action interface module 130, and may include different and/or additional modules. The social graph data store 140 includes data describing users of the social networking system 100 and connections between users and other users or objects, as described above. However, in other embodiments, the social networking system 100 may include different and/or additional modules.

In the embodiment of FIG. 1, a target user 105 accesses the social networking system 100 through the social networking system GUI module 120. For example, the target user is a registered user of the social networking system 100 accessing the social networking system through a client device, as further described below. The news ticker module 125 generates an interface presenting stories to a target user in a "ticker" or "news ticker." For example, the news ticker module 125 generates a news ticker in response to a request for a news ticker by the target user. The news ticker may be displayed by a separate page maintained by the social networking system 100 or may be displayed in a portion of the social networking system GUI, such as a dedicated news ticker interface. In one embodiment, the news ticker interface is displayed on within multiple pages of the social networking system 100, allowing the target user to view the news ticker when viewing different social networking system pages; the news ticker interface may also be displayed when the target user transitions between social networking system pages 100.

The news ticker may be moveable or customizable, allowing users to relocate the ticker, to resize the ticker, to adjust display settings of the ticker, to disable, to minimize or hide the news ticker. The target user can request a news ticker and news ticker stories passively (e.g., by accessing a social networking system page displaying a news ticker) or actively (e.g., providing an input requesting presentation of a news ticker). When a news ticker is displayed on a social networking system page, the news ticker may be continually updated with additional stories. For example, the news ticker may be updated in real-time to include additional stories as actions associated with the additional stories occur.

The news ticker displays stories to the target user. The stories are associated with the actions of users connected to the target user. For example, a story describes an action performed by a user as well as the user performing the action; the story may also identify any objects associated with the performed action. In the example of FIG. 1, acting user A 110A, acting user B 110B, and action user C 110C (collectively, "acting users 110") perform actions within the social networking system 100 via the action interface module 130. The acting users 100 may be explicitly connected to the target user 105 by a connection between the target user 105 and an acting user 100. In some embodiments an acting user 100 may be implicitly connected to the target user 105; for example the target user 105 may be implicitly connected to an acting user 110 by having biographical information or friends in common with the acting user 110 or by being a member of a common network with an acting user 110.

Examples of actions performed by the acting users 100 and described by stories include: sending messages to other users, expressing a preference for content maintained by the social networking system 100, establishing a connection to another social networking system user, playing a game, listening to a song, watching a video, editing a document, posting a status message, changing biographical information within the social networking system, or any other suitable action. As described above, actions performed outside of the social networking system 100 may be used to generate stories presented via the news feed. Additionally, acting users 110 may be associated with an action performed in the social networking system 100 rather than performing an action, and the association between acting user 110 and action may be presented as a story in a news ticker. For example, if a user connected to the target user is tagged in a photograph by a tagging user that is not connected to the target user, the user connected to the target user may be considered an acting user 110 and the tagging action may be presented via the news ticker.

Actions performed by a social networking system user are stored by the social networking system 100 and associated with the user performing the action, as well as objects or users on which the action was performed. For example, the social networking system stores an action in the social graph data store 140 as an edge connecting a node representing the acting user 110 and nodes representing other objects or users associated with the action. For example, if an acting user 110 uploads an image to the social networking system 100, an edge is stored in the social graph data store 140 connecting a node representing the acting user 100 with a node representing the uploaded image. As another example, if a user provides a comment to another user, an edge is stored in the social graph data store 140 between the user providing the comment and the user receiving the comment. Generally, a action performed in the social networking system 100 involves a user and at least one other object, although some actions may involve only the user performing the action. Hence, actions may be stored in the social graph data store 140 as edges connecting nodes representing the acting user and nodes representing the object, or objects, on which the action was performed. A timestamp indicating the time when an action occurred is stored in the social graph data store 140, and timestamps associated with actions may be used to chronologically order stories in the news ticker.

To identify stories for presentation to a target user 105 by a news ticker, the news ticker module 125 accesses the social graph data store 140 and identifies social networking system users connected to the target user 105. For example, users explicitly establishing connections to the target user 105 are identified. As another example, users connected to common users as the target user 105, having common biographical information with the target user 105 or having any other information common with the target user 105 are identified. Actions associated with the identified users connected to the target user 105 are retrieved from the social graph data store 140.

Stories describing the actions associated with the users connected to the target user 105 are generated by the news ticker module 125. One or more of the generated stories are selected and presented to the target user 105 via a news ticker. For example, a selected story describes an action performed by a user connected to the target user 105, the user connected to the target user 105 performing the actions and/or other users or objects associated with the action. Stories displayed by the news feed may include various types of information, such as plain text, links to objects or systems, images, or other suitable content. For example, if User B is tagged in a photograph by User A, a story indicating "User B was tagged in a photo by User A" is presented as a story in a news ticker. Stories displayed in the news ticker interface may be organized based on any suitable criteria. For example, stories may be organized chronologically, by relevance to the target user 105, or by any other suitable criteria. The relevance of a story to the target user 105 represents the likelihood that the target user 105 will be interested in viewing the story, or content associated with the story. A story's relevance may be based in part on the target user's affinity for a user performing an action associated with the story, the target user's affinity for an action associated with the story, the target user's affinity for an object on which an action associated with the story was performed, whether the story describes an action involving the target user 105, or any combination thereof. Additionally, stories may be associated with a story type, and stories may be organized or selected by the news ticker module 125 based on the story type.

In one embodiment, the news ticker module 125 continually monitors the social graph data store 140 for actions performed by acting users 110 connected to the target user 105. In this embodiment, the news ticker module 125 retrieves actions performed by the acting users in real-time, and updates the news ticker with stories associated with the retrieved actions. Hence, the target user 105 perceives the news ticker as being automatically updated. If the news ticker displays stories in chronological order, the news ticker is updated to display a story associated with the most recent action associated with an acting user 110. For example, the story associated with a most recent action is displayed at the top or bottom of the news ticker, and stories associated with older actions are repositioned within the news ticker. In one embodiment, the news ticker displays a specified number of stories, so when an additional story is added to the news ticker, a story previously displayed in the news ticker is removed. For example, when a story associated with a most recent action is added to the news ticker, a story associated with an oldest action is removed from being displayed by the news ticker.

In one embodiment, the news ticker module 125 may aggregate displayed stories based on the acting user 110 associated with the stories. In such an embodiment, the news ticker module 125 identifies a number of recent stories associated with each of a plurality of acting users, and displays a representation of the number of identified stories associated with each acting user within a news ticker. In such an embodiment, a list of the plurality of acting users is displayed in the ticker, and a representation of the number of identified stories associated with each displayed acting user is displayed in conjunction with the displayed acting user. In this embodiment, the plurality of acting users can be displayed within the ticker in any order, for instance based on the number stories associated with each displayed acting user, based on the most recent story associated with each display acting user (the story associated with the most recent action), the affinity between each displayed acting user and the target user 105, and the like.

Stories selected for presentation by a news ticker may be selected based on a variety of criteria. For example, stories may be selected so that stories associated with a variety of story types are displayed, providing diversity in the types of stories displayed. Similarly, stories may be selected based in part on the acting users 110 and/or actions associated with the stories. This allows the news feed to include stories associated with different acting users 110 and/or associated with different actions. Additionally, the target user's affinities for acting users 110 or objects associated with stories may be used so that the news feed includes stories associated with acting users 110 or objects most likely to be of interest to the target user 105. Selection of stories for the news ticker is further described below in conjunction with FIG. 2.

Selecting a story displayed in the news ticker may cause display of additional information associated with the selected story. In one embodiment, selecting a story displays actions associated with the selected story. For example, clicking on a story describing a photograph uploaded by User A causes display of comments on the photograph posted by other users. As another example, accessing on a story describing that User A posted content to User B may display other content posted to User B or may display previous content posted between User A and User B. Alternatively, selecting a story displayed in the news ticker may cause display of objects associated with the story. For example, selecting a story describing a comment on a photograph by User B may cause the photograph to be displayed along with additional comments associated with the photograph. Selecting a story associated with a media item, such as an audio file or a video, may cause the media item to be presented, and may also present additional information about the media item associated with the selected story Hence, in various embodiments, selecting a story presented in a news ticker may present the target user 105 with additional information about users or objects associated with the selected story or may allow the user to access content associated with the selected story.

An object associated with a story may affect the content presented to a target user 105 selecting the story. For example, selecting a story associated with an event may display additional information about the event, such as the location of the event, the purpose of the event, the time and date of the event, and the identities of any friends attending the event. In one embodiment, if the target user 105 has been invited to the event, selecting the story associated with the event provides the target user 105 with an interface for joining the event. Similarly, selecting a story associated with a location may display additional information about the location, a map to the location, or the identities of other users that have checked into the same location. Selecting a story associated with a user altering its user profiler information may display additional information about the user profile information or may identify additional users having common user profile information. Hence, selecting a story may provide the target user 105 with any suitable information about the acting user 110, action and/or object associated with the story.

In one embodiment, the additional information displayed when a story is selected is displayed within the news ticker interface. For example, the additional information is displayed proximate to the selected story and other stories are repositioned within the news ticker. Alternatively, the additional information may be displayed in a separate interface. For example, the additional information is displayed in a pop-up window adjacent to the news ticker interface, in an additional ticker proximate to the news ticker, or in another area of the social networking system GUI 120. In one embodiment, a news ticker is displayed in a first column within the social networking system GUI 120 and additional information associated with a story selected from the news ticker is displayed in a second column of the social networking system GUI 120, which may be adjacent to the first column. Alternatively, selecting a story displayed in the news ticker may present the target user 105 with separate page including additional information related to the selected story.

In one embodiment, the additional information displayed when a story from the news ticker is displayed may be based on information determined to be relevant to the target user 105. For example, if the target user selects a story associated with a photograph, the photograph as well as comments associated with the photograph can be displayed, or the displayed comments may be limited to comments by users connected to the target user. When a story presented in the news ticker is selected, the news ticker module 125 retrieves additional information associated with the selected story from the social graph data store 140. For example, the news ticker module 125 retrieves information associated with actions, objects, acting users 110, or any other suitable information associated with the selected story form the social graph data store 140. Additional information about news ticker generation and presentation of additional information associated with a story selected from a news ticker is further described in U.S. patent application Ser. No. 13/323,737, filed on Dec. 12, 2011, which is hereby incorporated by reference in its entirety.

System Architecture

Figure 2:
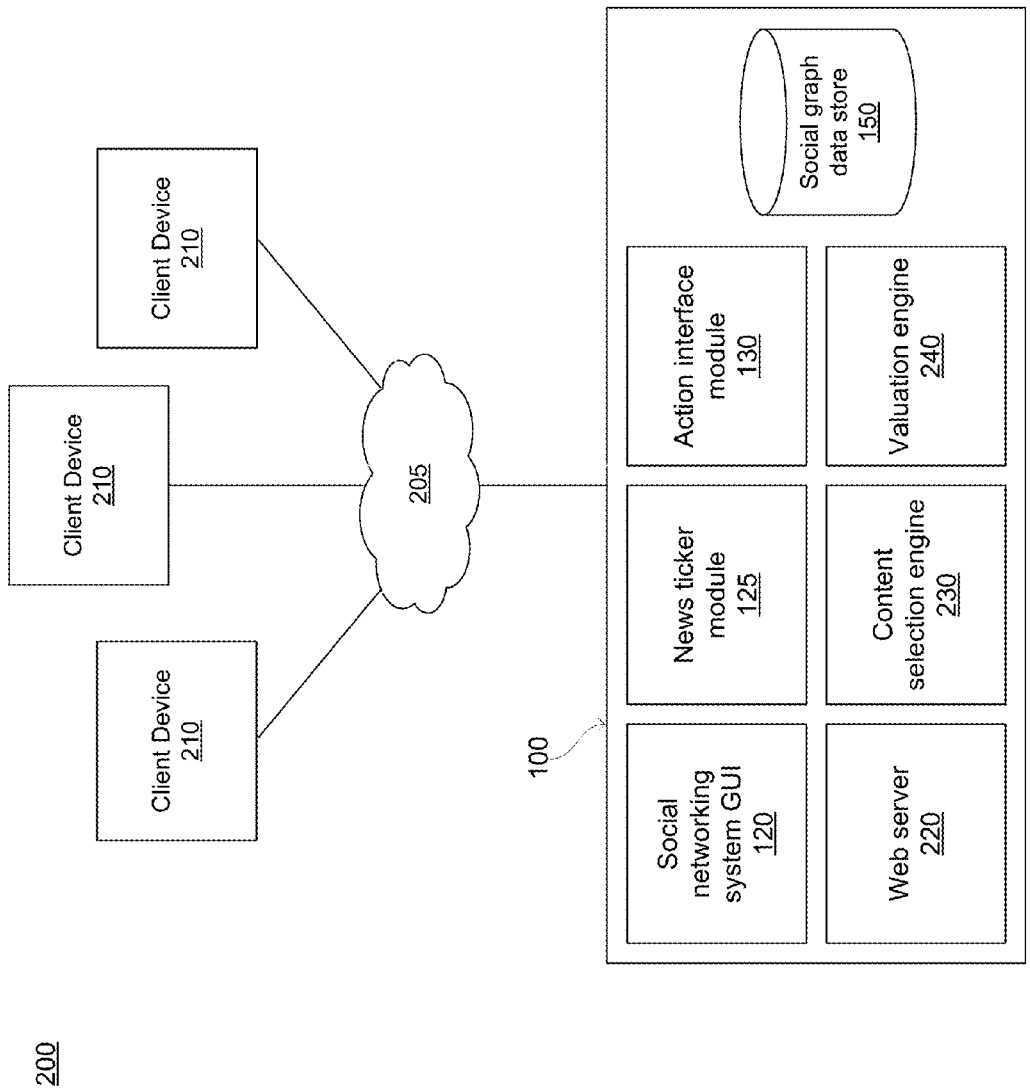
FIG. 2 is a high level block diagram of a system environment suitable for displaying news stories in a news ticker, according to one embodiment.

FIG. 2 is a high level block diagram of one embodiment of a system environment 200 for displaying stories from a social networking system 100 in a news ticker. The system environment 200 shown in FIG. 2 includes one or more client devices 210 communicating with the social networking system 100 through a network 205. While FIG. 2 shows three client devices 210, any number of client devices 210 may communicate with the social networking system 100. In alternative configurations, different and/or additional modules can be included in the system environment 200.

The network 205 may be the Internet, a local area network, a wireless network, a cellular network, or any other network enabling communication of data. The network 205 may use standard communications technologies and/or protocols. In addition, the network 205 may comprise a wireless network, a wireless network, or any combination of wireless and wired networks For example, the network 205 includes a cellular network which interfaces with the Internet, allowing a client device 210 communicating with the cellular network to communicate with the social networking system 100.

The client devices 210 may be any of device capable of sending or receiving data and processing data. Examples of client devices 210 include: a mobile phone, a laptop computer, a netbook computer, a tablet computer, a desktop computer, or a television. A user of a client device 210 interacts with the social networking system 100 via an application, such as a web browser or a native application, to interact with content maintained by the social networking system 100. Examples of interaction with content maintained by the social networking system 100 include: browsing content, posting messages, sending messages, establishing connections with other users, uploading content items, receiving messages, or any other suitable interaction.

The social networking system 100 shown by FIG. 2, includes a social networking system graphical user interface (GUI) module 120, a news ticker module 125, an action interface module 130, a web server 220, a content selection engine 230, a valuation engine 240, and a social graph data store 140. In alternative embodiments, the social networking system 100 includes fewer, additional, or different components than shown by FIG. 2. The GUI module 120, the news ticker module 125, and the action interface module 130 are described above in conjunction with FIG. 1.

The web server 220 links the social networking system 100 via the network 205 to the one or more client devices 210, as well as to one or more third party websites. The web server 220 serves web pages, as well as other web-related content, such as JAVA®, FLASH®, extensible markup language (XML) and so forth. The web server 220 may provide the functionality of receiving and routing messages between the social networking system 100 and the client device 210, for example, instant messages, queued messages (e.g., email), text and SMS (short message service) messages, or messages sent using any other suitable messaging technique. A user may send a request to the web server 220 to upload information, for example, images or videos that are stored in the social graph data store 140. Additionally, the web server 220 may provide application programming interface (API) functionality to send data directly to native client device operating systems, such as IOS®, ANDROID™, WEBOS®, or WINDOWS PHONE®.

Story Selection for Display in News Ticker

The content selection engine 230 identifies a set of candidate stories describing actions associated with users connected to a target user 105, and selects one or more stories from the set of candidate stories for display in a news ticker. In one embodiment, the content selection engine 230 identifies candidate stories by identifying users connected to the target user 105 via from the social graph data store 140 and identifying actions associated with the users connected to the target user 105. The candidate stories are generated from the actions associated with the users connected to the target user 105. In one embodiment, the content selection engine 230 identifies candidate stories in response to a request for stories to display in a news ticker.

In one embodiment, stories are selected from the candidate stories based on the time of the action associated with each of the candidate stories. For example, stories associated with an action occurring within a threshold time of the current time are selected and presented in the news feed. In one embodiment, a specified number of stories are requested, and the content selection engine 230 selects the specified number of stories from the candidate stories associated with actions having the most recent times for display. The content selection engine 230 may retrieve or receive additional stories from the social graph data store 140 associated with more recent actions and update the news ticker accordingly. This allows the content selection engine 230 to dynamically update the candidate stories, allowing the stories in the news ticker to be dynamically updated.

Figure 3A:
FIG. 3a is an example social networking system user interface displaying a news ticker, according to one embodiment.

FIG. 3a is an embodiment of social networking system interface 300a displaying news stories in a news ticker. In the embodiment of FIG. 3a, the social networking system interface 300a displays a news feed 300 for the user Jane Smith. The news feed 300 includes various stories selected by the social networking system 100 as likely to be of interest to Jane Smith. In the example of FIG. 3a, the news feed 300 includes a question asked by User A (with associated answer interface) and a picture uploaded by User B (with likes by User C and others, as well as a comment by User D). In FIG. 3a, a news ticker 310a is displayed adjacent to the news feed 300. The news ticker 310 shown by FIG. 3a includes stories describing actions performed by users connected to Jane Smith. In FIG. 3a, the stories in the news ticker 310a are presented in chronological order based on the time of the actions associated with the stories. However, in other embodiments, the content selection engine 230 may select stories for presentation in the news ticker 310 based on any suitable criteria, as further described below.

The news ticker 310 be updated to include new stories automatically or in response to the content selection engine 230 or news ticker module 125 receiving an update request. The stories presented in the news ticker 310a may include any suitable information describing an action associated with a user connected to the target user 105 (Jane Smith in the example of FIG. 3a). In the example of FIG. 3a, stories in the news ticker 310a include a picture of a user associated with the story, a name of the user associated with the story, a description of the action associated with the story, and a time when the action associated with the story occurred.

As described above, the content selection engine 230 identifies a set of candidate stories from the social graph data store 140 and selects stories from the candidate stories for presentation in the news ticker 310a. For example, stories associated with the most recent actions associated with users connected to the target user 105 are selected for presentation in the news ticker 310. Hence, the news ticker 310a presents stories describing actions performed by users connected to the target user 105 associated with most recent times. Stories in the news ticker 310a may be removed as more recent stories are selected for display, limiting the number of stories shown by the news ticker 310. For example, if a story regarding an RSVP to an event by an acting user 110 is identified by the content selection engine 230, and a story regarding an RSVP is already displayed in the ticker, the content selection engine may replace the displayed story with the identified story because the identified story occurred more recently than the displayed story.

The content selection engine 230 may select stories from the candidate stories based on other factors, such as the affinities between the target user 105 and the content of the candidate stories, the users associated with the candidate stories, and/or the objects with the candidate stories. For example, candidate stories for which the user has at least threshold affinity for content of the candidate stories or for which the user has at least a threshold affinity for users associated with the candidate stories are selected. As another example, candidate stories for which the user has the highest affinities for content or users associated with the candidate stories are selected. This allows the news ticker 310a to display stories most likely to be of interest to the target user 105. In one embodiment, the target user 105 can set and adjust how often stories in the news ticker 310a are replaced and/or the factors considered by the content selection engine 230 in determining to replace stories in the ticker.

In one embodiment, the content selection engine 230 selects stories from the candidate stories based on a time-discounted relevance of each candidate story. Hence, the relevance of a story decreases over time, increasing the likelihood that stories describing more recent actions are shown by the news ticker 310a. The relevance of stories to the target user 105 may decrease at different rates over time based on various factors, such as affinity between the acting user 110 associated with a story and the target user 105, the type of story, or any other suitable factor. In one embodiment, the target user 105 may specify the relevance of story types, the time thresholds used in determining relevance, and other factors. For example, if a story involving a family member of the target user 105 is displayed in the news ticker 310a and a story involving a casual acquaintance of the target user 105 is a candidate story and the story involving the family member is associated with an action occurring more than a threshold amount of time before an action associated with the story involving the casual acquaintance, the content selection engine 230 may select the story involving the casual acquaintance to replace the story involving the family member. However, if the story involving the family member is associated with an action occurring less than the threshold amount of time before an action associated with the story involving the casual acquaintance, the story involving the family member is not replaced.

Additional factors may be used by the content selection engine 230 to select stories from the candidate stories. For example, the content selection engine 230 accounts for a diversity of story types, diversity of users associated with stories, diversity of actions associated with stories, or any other suitable criteria when selecting stories. After a group of initial stories are selected for presentation in the news ticker 310a, stories subsequently selected for presentation in the news ticker 310a are selected from candidate stories so that one or more story types, users associated with stories and/or actions associated with stories are displayed in the news ticker 310a based on the initially presented stories.

Displaying a diversity of stories in the news ticker 310a presents a target user 105 with stories describing a variety of actions, acting users 110, objects, story types, or any other suitable characteristic. For example, the content selection engine 230 determines a story type associated with each candidate story and also determines the number of stories currently displayed in the news ticker associated with various story types. Stories from the candidate stories are selected so that a threshold number of stories in the news ticker 310a have a particular story type or so that a threshold number of stories associated with different story types are displayed in the news ticker 310a. Similarly, the content selection engine 230 may identify actions associated with each of the candidate stories and with each of the stories displayed in the news ticker 310a and selects stories from the candidate stories so that a threshold number of stories in the news ticker 310a are associated with an action or so that a threshold number of different actions are associated with stories in the news ticker 310a.

To provide a diversity of story types in the news ticker 310a, the content selection engine 230 selects stories from the candidate stories so that a threshold number of stories associated with different story types are displayed in the news ticker 310a at a time. In one embodiment, the story type associated with candidate stories is used along with the time associated with an action in the candidate stories, allowing the most recent story associated with different story types to be selected. When a new candidate story of a particular story type is selected and the news ticker 310a is already displaying the threshold number of stories having the particular story type, the content selection engine 230 may remove a displayed story having the particular type from the news feed 310a and display the newly selected candidate story. Other stories in the news feed 310a may be repositioned when the newly selected candidate story is displayed.

In one embodiment, the threshold number of stories of a story type displayed in the news ticker 310a may be determined based on story type. The threshold number of stories of a story type may be modified by the target user 105. In some embodiments, additional factors may be used by the content selection engine 230 to select stories from the candidate stories. For example, the content selection engine 230 may select a candidate story having a particular story type even when the threshold number of stories of the particular story type is displayed if an affinity between the acting user 110 associated with the selected candidate story and the target user 105 exceeds a threshold, if the affinity between the target user 105 and an object or other content associated with the selected candidate story exceeds a threshold, or based on any other suitable criteria. For example, if a threshold number of stories regarding uploaded images are displayed in the ticker, the content selection engine 230 may identify a first additional story regarding an uploaded image by an acting user 110 with which the target user 105 has less than a threshold affinity and does not select the first additional story for display. However, the content selection engine 230 may select a second additional story regarding an uploaded image associated with an acting user with which the target user has at least the threshold affinity for display even though the threshold number of stories regarding uploaded images are displayed.

Additional factors may also be used to select stories from the candidate stories. Examples of factors that may be used in conjunction with story type and/or target user affinity include: distance between a location associated with an action associated with a candidate story and a location of the target user 105, time associated with an action associated with a candidate story, connection type between the target user 105 and one or more users associated with a candidate story, or other suitable factors. The factors used by the content selection engine 230 may be modified and/or prioritized by the target user 105 or may be modified by the content selection engine 230.

In one embodiment, the stories presented in the news ticker 310a are organized based on story type. For example, the target user 105 may specify preferences for different story types and the stories in the news ticker 310 are organized based on the user preferences; story types having a higher user preference may be more prominently displayed so they are more noticeable to the target user 105. Alternatively, the content selector 230 may use a combination of user affinity for content in a story as well as story type to organize the stories presented in the news ticker 310a.

In one embodiment, the content selection engine 230 or the news ticker module 125 removes a currently displayed story associated with the same type of action or story type as a story selected from the candidate stories based on the number of displayed stories associated with the same type of action, associated with the same story type, based on number of types of actions associated with the displayed stories, or based on the number of story types associated with the displayed stories.

Alternatively, the content selection engine 230 selects stories from candidate stories so the news ticker 310a presents stories associated with diverse acting users 110. For example, the content selection engine 230 selects stories for display in the news ticker 310a by determining the number of stories displayed in the news ticker 310a associated with an acting user 110 or by determining a number of different acting users 110 associated with stories displayed in the news ticker 310a. Acting users 110 associated with each of the candidate stories are determined, and the content selection engine 230 selects candidate stories so that the news ticker 310a includes a threshold number of stories associated with an acting user 110 or so that the news ticker 310a includes stories associated with a threshold number of different acting users 110.

The content selection engine 230, or the news ticker module 125, may remove one or more stories included in the news ticker 310a when a story associated with a particular acting user 110 is selected for display in the news ticker 310a, to limit the number of stories in the news ticker 310a associated with the particular user or to increase the number of different acting users 110 associated with stories in the news ticker 310a. Selecting stories for presentation in the news ticker 310a may also be based, at least in part, on the affinity between the target user 105 and an acting user 110 associated with a story. For example, stories associated with acting users 110 with which the target user 105 has at least a threshold affinity or with which the target user 105 has at the highest affinities are selected for presentation via the news ticker 310a.

The number of stories associated with an acting user 110 included in the news ticker 310a may depend on the identity of the acting user 110, on the affinity of the target user 105 for the acting user 110, or on any other suitable criteria. For example, the threshold number of stories in the news ticker 310a associated with an acting user 110 may be proportional to the affinity of the target user 105 for the acting user 110. This allows the news ticker 310a to include a greater number of stories associated with acting users 110 for which the target user 105 has higher affinities, increasing the likelihood that the target user 105 will have an interest in the stories in the news ticker 310a.

In one embodiment, the stories in the news ticker 310a may be organized based on the acting users 110 associated with the stories. For example, the target user's affinity for acting users 110 associated with the stories as well as the times associated with actions associated with the stories are used to order the stories within the news ticker 310a. In an embodiment, the acting users 110 displayed in the news ticker 310a may be selected by the content selection engine 230, may be selected by the target user 105, or may be selected based on any suitable factor (e.g., affinities between the acting users 110 and the target user 105). The order of acting users 110 displayed in the news ticker 310a may be selected by the content selection engine 230, selected can be selected by the target user 105, or selected based on one or more factors. Examples of factors include: affinities between acting users and the target user 105, number of selected stories associated with acting users 110, or other suitable criteria. In one embodiment, the set of acting users 110 displayed in the ticker is substantially constant over time, and stories associated with one or more users in the set of acting users 110 are selected based on any suitable criteria, as described herein. If no new stories associated with a user in the set of acting users have occurred within a threshold time, an indication may be displayed that no new stories associated with the user; alternatively, the user may be replaced in the set with an additional user associated with one or more stories describing actions occurring within a threshold time interval.

In one embodiment, instead of selecting the most recent story associated with an acting user 110 for the news ticker 310a, the content selection engine 230 selects the most relevant story associated with an acting user 110 connected to the target user 105. For example, the content selection engine 230 identifies two stories associated with actions occurring at different times and selects the story associated with the later time in response to determining the story associated with the later time is more relevant to the target user 105. A story's relevance to the target user 105 may be based on a variety of factors, such as the target user's affinity for an acting user 110 associated with the story, the target user's affinity for content associated with the story, the distance between an object associated with the story and the target user's location, the time associated with the story, or any other suitable factor. As described above, a decay constant may be applied to a story's relevance so the story's relevance decreases over time.

The content selection engine 230 may identify and select stories for aggregated display in a news ticker 310a. A set of candidate stories are identified by the content selection engine 230, and one or more subsets of related candidate stories are identified. Related candidate stories have one or more characteristics in common with each other. Examples of subsets of related candidate stories include: stories associated with the same acting user 110, stories associated with the same action, stories associated with the same story type, and so forth. An aggregated representation of a subset of related candidate stories is generated and displayed in the news ticker. The aggregated representation may identify a user name and the number of stories associated with the user name and may also provide an indication of the content of the stories associated with the user name. Alternatively, the aggregated representation may identify an action or story type and provide a number of stories associated with the action or story type.

For example, content selection engine 230 selects stories for presentation in a news ticker 310a by selecting a first story from the candidate stories based on any suitable criteria, as described above. An acting user 110 associated with the selected first story is identified, and the content selection engine 230 retrieves additional actions from the social graph data store 140 associated with the acting user 110 and generates stories based on the additional actions. As stories associated with different acting users 110 are selected, additional actions associated with the different acting users 110 are identified and used to generate additional stories. A threshold number of stories may be associated with an identified acting user 110, limiting the number of stories in an aggregated representation of stories associated with the identified acting user 110. Additional criteria may be used when retrieving additional actions associated with the identified acting user 110. For example, the content selection engine 230 selects additional stories associated with an identified acting user 110 based on a threshold time between the current time and the time associated with an action associated with a story, based on a threshold level of relevance of the story to a target user 105, or based on any other suitable criteria.

Figure 3B:
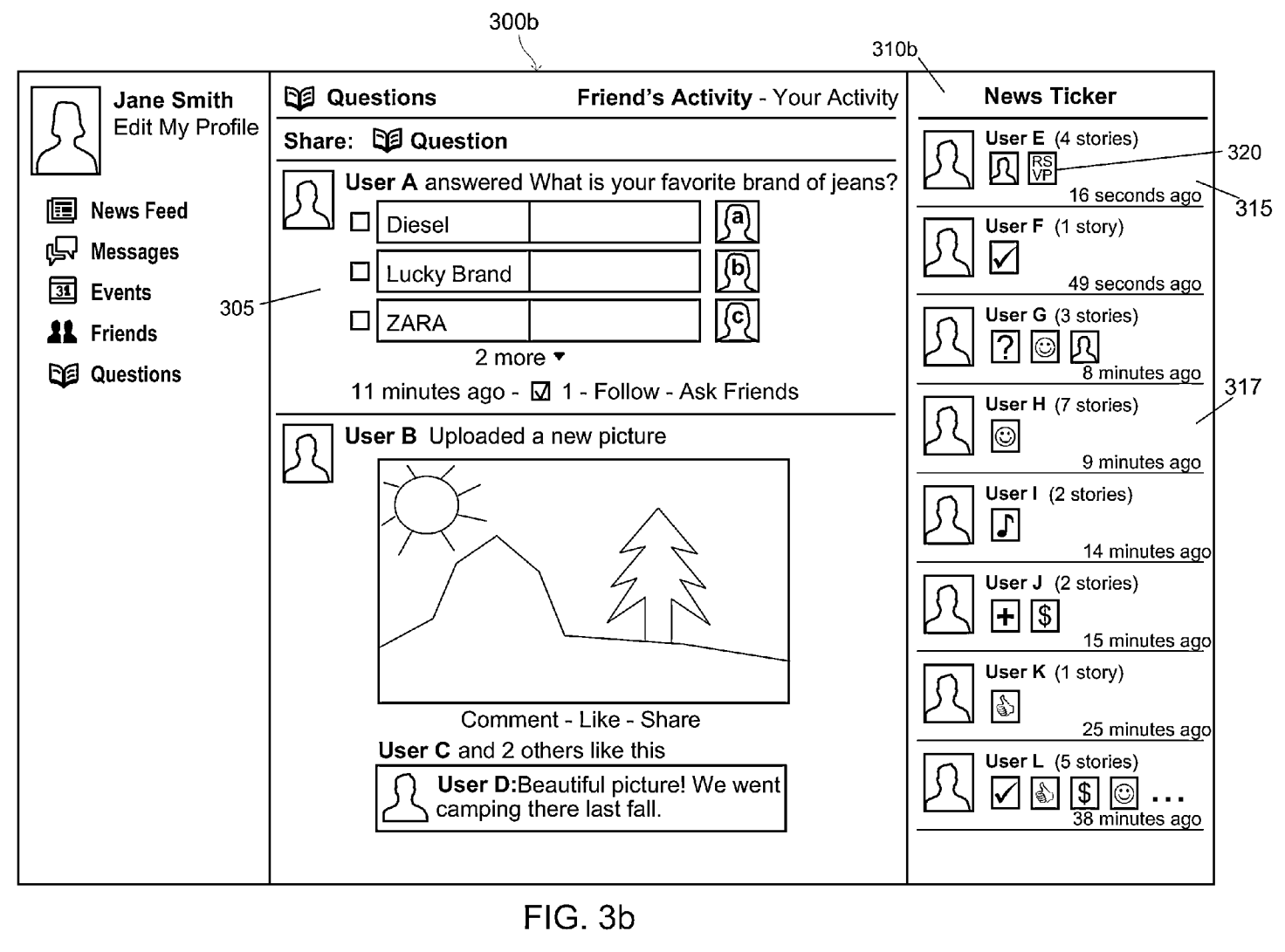

FIG. 3b is an example user interface 310b including a news ticker 310b displaying aggregated representations of related stories. In the embodiment of FIG. 3b, the news ticker 310b displays a plurality of acting users 110 (for instance, User E, User F, and so forth) and displays a number representing selected stories associated with the acting user 110. For example, in FIG. 3b, an aggregated representation of stories 315 associated with User E identifies User E and provides text of "4 stories" to indicate that 4 stories associated with User E are included in the news ticker 310b. However, in other embodiments, most recent or most relevant story from an aggregated representation of stories 315 is displayed along with an identification of an acting user 110 associated with the aggregated representation of stories 315. An indicator of the number of additional selected stories in the aggregated representation of stories 315 may also be displayed.

The example of FIG. 3b also displays icons 320 in conjunction with an aggregated representation of stories 315 to indicate the types of stories associated with the aggregated representation of stories 315. In one embodiment, each icon 320 represents a different type of story. When an icon 320 is selected, additional information associated with stories associated with an acting user 110 associated with the aggregated representation of stories 315 may be displayed. In one embodiment, if an aggregated representation of stories 315 includes multiples stories having the same type, a single icon 320 associated with the story type is displayed. For example, the aggregated representation of stories 317 associated with User H in FIG. 3b is associated with seven selected stories associated User H establishing a connection with other users, but a single icon 320 representing "connection" is shown in the aggregated representation of stories 317 associated with User H. An aggregated representation of stories 315 may also identify a time associated with the most recent story included in the aggregated representation of stories 315, a time associated with the story in the aggregated representation of stories 315 most relevant to the target user 315, or a time associated with any other suitable story in the aggregated representation of stories 315.

The content selection engine 230 may organize aggregated representations of stories 315 in the news ticker 310b based on any suitable criteria. For example, the aggregated representations of stories 315 are organized chronologically based on the most recent action associated with a story included in an aggregated representation of stories 315. As another example, the aggregated representations of stories 315 are organized chronologically based on a time associated with a story included in an aggregated representation of stories, having the highest relative relevance, among stories in the aggregated representation of stories 315, to the target user 105. Alternatively, the aggregated representations of stories 315 may be organized based on the target user's affinities for the acting users 110 associated with each of the displayed aggregated representations of stories 315.

Figure 3C:
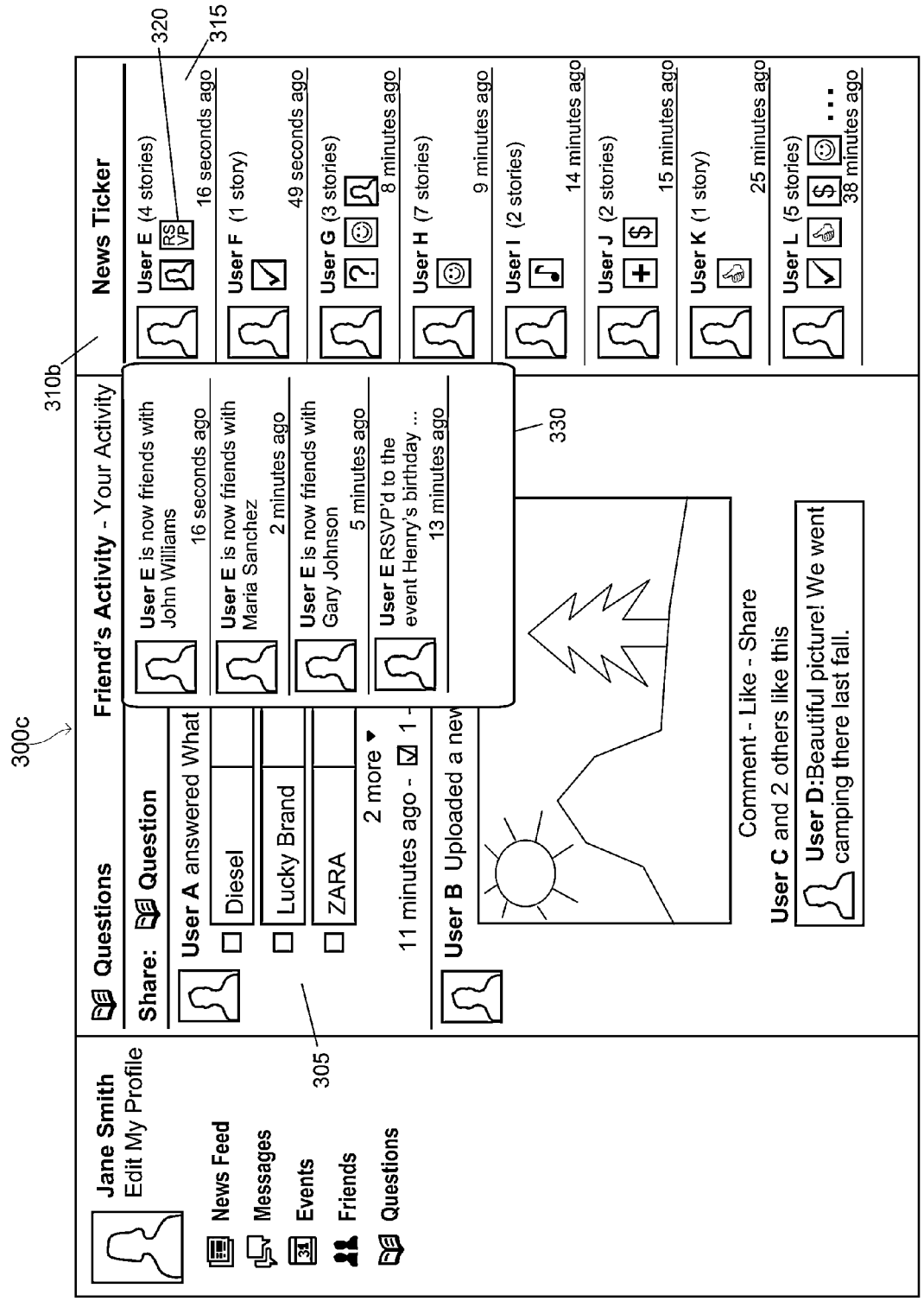
FIG. 3c is an example social networking system user interface displaying additional information for a selected aggregated representation of multiple stories, according to one embodiment.

In one embodiment, when an aggregated representation of stories 315 is selected, additional information associated with the acting user 110 associated with the aggregated representation of stories 315 is displayed. The additional information may be displayed in the news ticker 310b, in a separate interface, a separate page maintained by the social networking system 100, or in any other suitable location. FIG. 3c is an example of a user interface 300c, showing the news ticker 310b of the user interface 300b of FIG. 3b along with additional information for a selected acting user. In the example of FIG. 3c, the aggregated representation of stories 315 associated with User E is selected, and a pop-up interface 330 including information associated with the 4 stories in the aggregated representation of stories 315 is displayed. The first three stories involve the establishment of a friendship with other users, while, and the fourth story involves an RSVP by User E to an event. The pop-up interface 330 may include navigation elements, such as scroll bars or links to allow the target user 105 to navigate through content presented by the pop-up interface 330.

In example of FIG. 3b, the content selection engine 230 may identify and select additional stories for presentation by the news ticker 310b as actions are captured by the social graph data store 140, allowing real-time updating of the news ticker 310b. If a story associated with an acting user 110 already displayed in the ticker is selected by the content selection engine 230, the news ticker 310b is updated by incrementing an aggregated representation of stories 315 associted with the acting user 110 to indicate the additional story associated with the acting user 110. In one embodiment, the aggregated representations of stories 315 may be re-ordered as additional stories are associated with different acting users 110. If the content selection engine 230 selects a story associated with an acting user 110 that is not displayed in the news ticker 310b, a displayed aggregated representation of stories 315 associated with a different acting user 110 may be removed from the news ticker 310b and an aggregated representation of stories 315 associated with the acting user 110 is displayed. The aggregated representation of stories 315 removed from the news ticker 310b may be selected based on any suitable factor. Example of factors include: the acting user 110 associated with one or more stories that occurred the least recently, the acting user 110 associated with the fewest stories, the acting user 110 associated with stories least relevant to the target user 105, the acting user 110 with which the target user 105 has the lowest affinity, or any other suitable criteria.

In an embodiment, the content selection engine 230 may aggregate stories based on story type. Stories included in the news ticker are aggregated based on story type, with the news ticker identifying aggregated representations of stories that include multiple stories having a common story type. An aggregated representation of stories may include a number of acting users associates with stories in the aggregated representation of stories. A specified number of stories having a story type or a specified number of stories may be included in an aggregated representation of stories based on story type. Additional factors, such as time associated with actions associated with stories or relevancy of stories to the target user 105, may be used when selecting stories included in an aggregated representation of stories based on story type. As described above, the ordering of the aggregated representations of stories in the news ticker may be based on any suitable factor, such as relevance to the target user 105, regency, affinity between the target user 105 and acting users 110, or any other suitable factors.

The stories selected by the content selection engine 230 and their ordering in the news ticker may be based on the context of the target user 105 within the social networking system 100. The target user's context in the social networking system 110 accounts for the content of the social networking system 100 accessed by the target user 105. For example, if the target user 105 is listening to music through a social networking system interface, the content selection engine 230 may select stories associated with the listening of music, may increase the relevance of stories associated with music, and the like. Similarly, if the target user 105 is viewing a social networking system profile page associated with a particular user, the content selection engine 230 may select or increase the relevance of stories associated with the particular user. Thus, the content selection engine 230 can identify content being accessed, or previously accessed, by the target user 105 and modify selection of stories for a news ticker based on objects in the social networking system 100 associated with the content accessed by the target user 105. This increases the likelihood that the target user 105 will be interested in stories presented by the news ticker.

Figure 5:
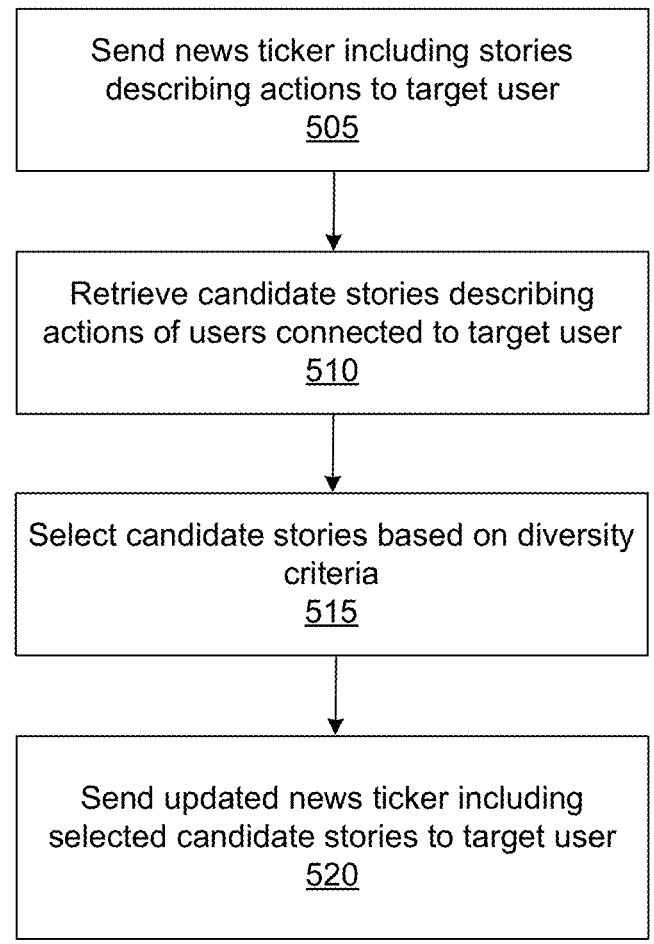
FIG. 5 is a flow chart of a process for displaying a news ticker including stories describing actions of social networking system users, according to one embodiment.

FIG. 5 is a flow chart of one embodiment of a process 500 for displaying a news ticker including stories describing actions by social networking system users. A news ticker is sent 505 from the social networking system 100 for display to a target user 105. The news ticker presents a plurality of stories that each describes an action performed by a user of the social networking system connected to the target user 105. In one embodiment, a story presented by the news ticker identifies the user performing the action described by the story.

The content selection module 230 retrieves 510 candidate stories based on information in the social graph data store 140. For example, the content selection module 230 identifies one or more acting users 110 connected to the target user 105 and identifies actions performed by the acting users 110. In one embodiment, the identified actions are selected based on a time associated with the actions. For example, actions associated with a time within a threshold time of a current time are selected. Further, the one or more acting users 110 may be identified based on affinities between the target user 105 and each of the acting users 110. For example, acting users 110 associated with at least a threshold affinity of the target user 105 or associated with the highest affinities of the target user 105 are identified.

One or more diversity criteria are used by the content selection module 230 to select 515 candidate stories. As described above in conjunction with FIGS. 1-3b, the content selection module 230 may apply diversity criteria so that the news ticker includes a variety of stories. For example, applying diversity criteria selects 515 candidate stories based in part on story types associated with candidate stories and with stories in the news ticker. This selects candidate stories so the news ticker includes at least a threshold number of stories associated with a particular story type, so the news ticker includes at least a threshold number of different story types, or based on any other criteria depending on the story types.

As another example, applying diversity criteria selects 515 candidate stories based on acting users 110 associated with the candidate stories or based on actions associated with the candidate stories. Candidate stories may be selected 515 based on the target user's affinity for acting users 110, or other information, associated with candidate stories, so candidate stories for which the target user 105 has at least a threshold affinity, or for which the target user 105 has the highest affinities, are selected. Alternatively, candidate stories may be selected 515 so that the news ticker includes stories associated with at least a threshold number of different users or includes at least a threshold number of stories associated with a user. Similarly, candidate stories may be selected 515 so that stories in the news ticker are associated with a threshold number of action types, so that a threshold number of stories in the news ticker are associated with a particular action type, or so that stories in the news ticker are associated with actions associated with an acting user 110 for which the target user 105 has at least a threshold affinity. Selection of candidate stories based on diversity criteria is further described above in conjunction with FIGS. 1-3a. As described above in conjunction with FIGS. 1-3b, stories included in the news ticker may be removed when a candidate story is selected 515 to satisfy diversity criteria. For example, selecting 515 a candidate story having a story type causes a story displayed by the news ticker having the same story type to be removed to maintain a specified number of stories having the story type. The news ticker is updated to include the selected candidate stories and the updated news ticker is sent 520 to the target user 105 for display, as described above in conjunction with FIGS. 1 and 2.

Figure 6:
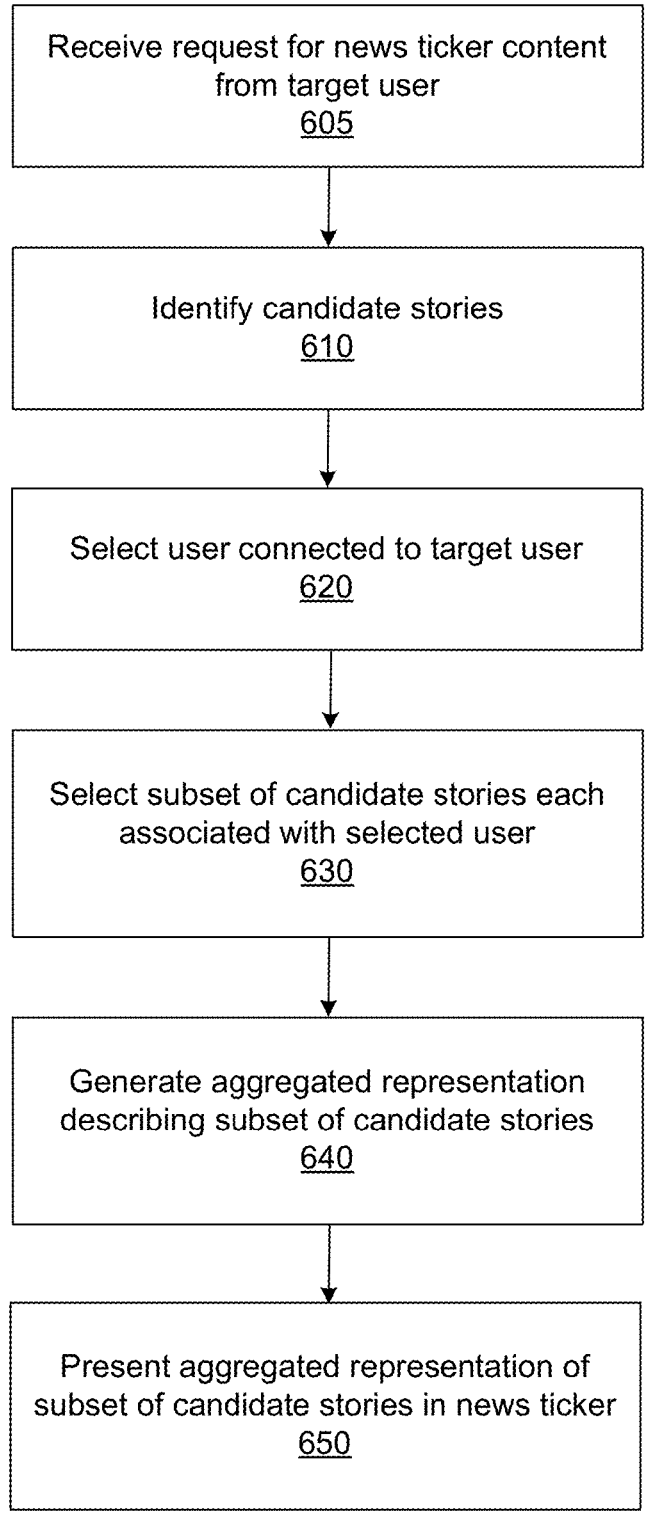
FIG. 6 is a flow chart of a process for aggregating stories in a news ticker, according to one embodiment.

FIG. 6 is a flow chart of one embodiment of a process 600 for aggregating stories in a news ticker and presenting a description of the aggregated stories via the news ticker. A request is received 605 for news ticker content from a target user 105. For example, a request to update stories presented by a news ticker or a request to update the stories presented by a news ticker is received 605. A candidate stories describing actions performed by one or more acting users 110 connected to the target user are identified from the social graph data store 140, as further described above.

From the acting users 110 associated with the candidate stories, a user connected to the target user 105 is selected 620. In one embodiment, the user is selected 620 based on affinities between the target user 110 and the acting users 110. For example, the acting user 110 with which the target user 105 has the highest affinity is selected 620, or an acting user 110 with which the target user 105 has at least a threshold affinity is selected 620. Alternatively, the user is selected 620 based on actions associated with the user. For example, a user associated with an action associated with a most recent time or associated with an action associated with a time within a threshold time of a current time is selected 620.

A subset of the candidate stories associated with the selected user are selected by the content selection engine 230. Hence, the subset of the candidate stories are each associated with a common user, allowing the content selection engine 230 to group candidate stories each associated with a common user. In one embodiment, the subset includes a specified number of stories to limit the size of the subset. As described above in conjunction with FIGS. 3c and 3c, an aggregated representation describing the subset of candidate stories in generated 640 and presented 650 via the news ticker. The aggregated representation of the subset of candidate stories identifies the user associated with each candidate story in the subset and also describes the candidate stories included in the subset. For example, the aggregated representation identifies types of actions associated with stories in the subset or identifies a number of stories included in the subset.

Alternatively, the content selection engine 230 may select a story type from story types associated with candidate stories and select a subset of the candidate stories associated with the selected story type. An aggregated representation describing the subset of the candidate stories identifying the selected story type and information associated with the subset of the candidate stories may be generated and presented by the news ticker. For example, the aggregated representation describing the subset of candidate stories identifies the number of stories in the subset, users associated with stories in the subset, or any other suitable information. Hence, the content selection engine 230 may use any suitable information associated with candidate stories to generate an aggregated of multiple candidate stories having a common characteristic.

Value Determination of News Ticker Content

Referring back to FIG. 2, the social networking system 100 may also include a valuation engine 240 for selecting one or more types of content to present to a target user via the news ticker. Examples of types of content include: stories, advertisements ("ads"), surveys, questions, recommendations, or other suitable content. While described in the context of selecting content types for presentation via a news ticker, the valuation engine 240 may be used to select content for presentation to a target user via any suitable channel. The valuation engine 240 selects types of content for presentation based on values associated with displaying different types of content. The "value" of displaying content may be based on a monetary value to the social networking system 100 (e.g., compensation for displaying an ad), an informational value to the social networking system 100 (e.g., the value to the social networking system 100 for receiving information about the target user 105 based on presentation of a type of content), a user satisfaction value (e.g., an increase in user satisfaction with the social networking system 100 because of content displayed to the target user 105), any combination of the preceding, or any other measure of value.

Based on the value of different types of content, the valuation engine 240 selects different types of content for presentation by a news ticker. The different types of content may be simultaneously displayed in the news ticker. In one embodiment, the valuation engine 240 selects types of content presented in a news ticker based on satisfaction of one or more value conditions. The valuation engine 240 associates different value conditions with user characteristics, so if a user has the specified characteristic, the value condition is satisfied. Value conditions may be associated with pre-determined values, which are used by the valuation engine 240 to select a type of content for presentation. For example, a value condition is that the target user 105 is connected to a threshold number of additional users via the social networking system 100. The content type presented to the target user 105 is based on whether the target user 105 is connected to greater than or less than the threshold number of additional users. For example, if the target user 105 is connected to less than the threshold number of additional users, advertisements are presented in the news ticker; if the target user 105 is connected to at least the threshold number of additional users, stories are presented in the news ticker. Multiple thresholds may be specified and associated with different value conditions. For example, a first type of content (e.g., advertisements) is presented if the target user 105 is connected to less than a first threshold number of users and a second type of content (e.g., stories) is presented if the target user 105 is connected to at least a second threshold number of users. In one embodiment, if the target user 105 is connected to a number of users greater than the first threshold number but less than the second threshold number, a combination of the first type of content and the second type of content is presented (e.g., both advertisements are stories are presented).

As another example, the valuation engine 240 associates a value condition with a threshold amount of time since stories were last displayed to a target user 105. Hence, the valuation engine may select a first type of content (e.g., stories) for display in the news ticker to a target user 105 if stories have not been presented to the user within the threshold amount of time, and may select a second type of content (e.g., advertisements) for display via the news ticker if stories have been presented to the target user 105 within the threshold amount of time.

Additionally, the valuation engine 240 may associate a value condition with a threshold number of stories associated with a target user 105 or a threshold number of connections established by the user within a specified time period. The valuation engine 230 retrieves information associated with the target user 105 from the social graph data store 140 to determine if the target user 105 satisfies the value criteria. As described above, different types of content may be presented to the target user 105 depending on whether the target user 105 satisfies the value criteria The valuation engine 240 determines the value to the social networking system 100 of displaying different types of content to a target user 105 in a news ticker and selects one or more of the types of content for display based on the determined values. The determined value of displaying a particular type of content can be based on an anticipated amount of revenue received by the social networking system 100 in exchange for displaying the particular type of content. For example, the valuation engine 240 determines that displaying an ad will result in $1 of immediate or short-term revenue for the social networking system 110, or can determine that displaying a recommendation of a connection for a target user 105 will result in $2 in future revenue for the social networking system 100. Alternatively, the determined value of displaying a particular type of content may be based on an anticipated amount of data that social networking system 100 will receive from a target user 105 if a particular type of content is presented to a target user 105. For example, the valuation engine 240 may determine that displaying stories will create several edges within the social graph as a result of the target user 105 selecting, commenting on, or otherwise interacting with one or more displayed stories. Further, the determined value associated with display of a particular type of content may be based on a context of the target user 105 within the social networking system 100. For example, the valuation engine 240 may determine that the revenue generated by displaying an ad while the target user 105 is viewing a newsfeed is lower than the revenue generated by displaying the ad while the target user is playing a game within the social networking system 100.

The valuation engine 250 may select one or more of the types of content determined to be the most valuable for display, may select any of one or more types of content for display having at least a threshold value, and may select one or more types of content for display based on the determined value of displaying a type of content. Other suitable factors may be used along with the value of displaying the content may also be used. In one embodiment, the values of displaying each type of content to the target user 105 are based on characteristics of the target user (such as biographic characteristics, geographic characteristics, hobbies, interests, viewpoints, and the like), the characteristics of users connected to the target user 105, groups to which the target user 105 belongs, objects (such as photos, videos, communications, posts, documents, and the like) associated with the target user 105, the location of the target user, or any other factor associated with the target user. For example, the value of displaying an ad associated with the movie "Reservoir Dogs" to a target user 105 may be based in part on whether the target user 105 lists "Reservoir Dogs" as an interest or favorite movie.

The valuation engine 240 may represent the value of displaying different types of content in any suitable format (e.g., monetary terms, a measurement of impact, a measurement of data acquisition, and the like), and may select one or more types of content by determining a common unit of measurement for the different values and selecting a type, or types, of content based on the values expressed in the common unit of measurement. Alternatively, the valuation engine determines values of displaying different types of content in different measurement units, weights the determined values based on a pre-determined ranking or impact of each of the different measurement terms, and selects one or more of types of content based on the weighted determined values. In one embodiment, the valuation engine 240 stores a pre-determined valuation associated with displaying different types of content The pre-determined valuations may be based on a variety of factors. Examples of factors include: the context of the target user 105 within the social networking system 100, based on an amount of time since a news ticker was last displayed to the target user 105, based on the number of friends of the target user, or any suitable factors.

The valuation engine 240 may recalculate the value of displaying different types of content if the target user's context in the social networking system 100 changes. For example, the values of displaying different types of content are recalculated when the target user 105 accesses a different page in the social networking system 110 or performs another suitable interaction with via the social networking system 110. Based on the recalculated values of displaying different types of content, the valuation engine 240 may modify the types of content displayed via the news ticker. Thus, as the target user's context in the social networking system 100 changes, the type, or types, of content presented to the target user via the news ticker may also change.

Figure 4:
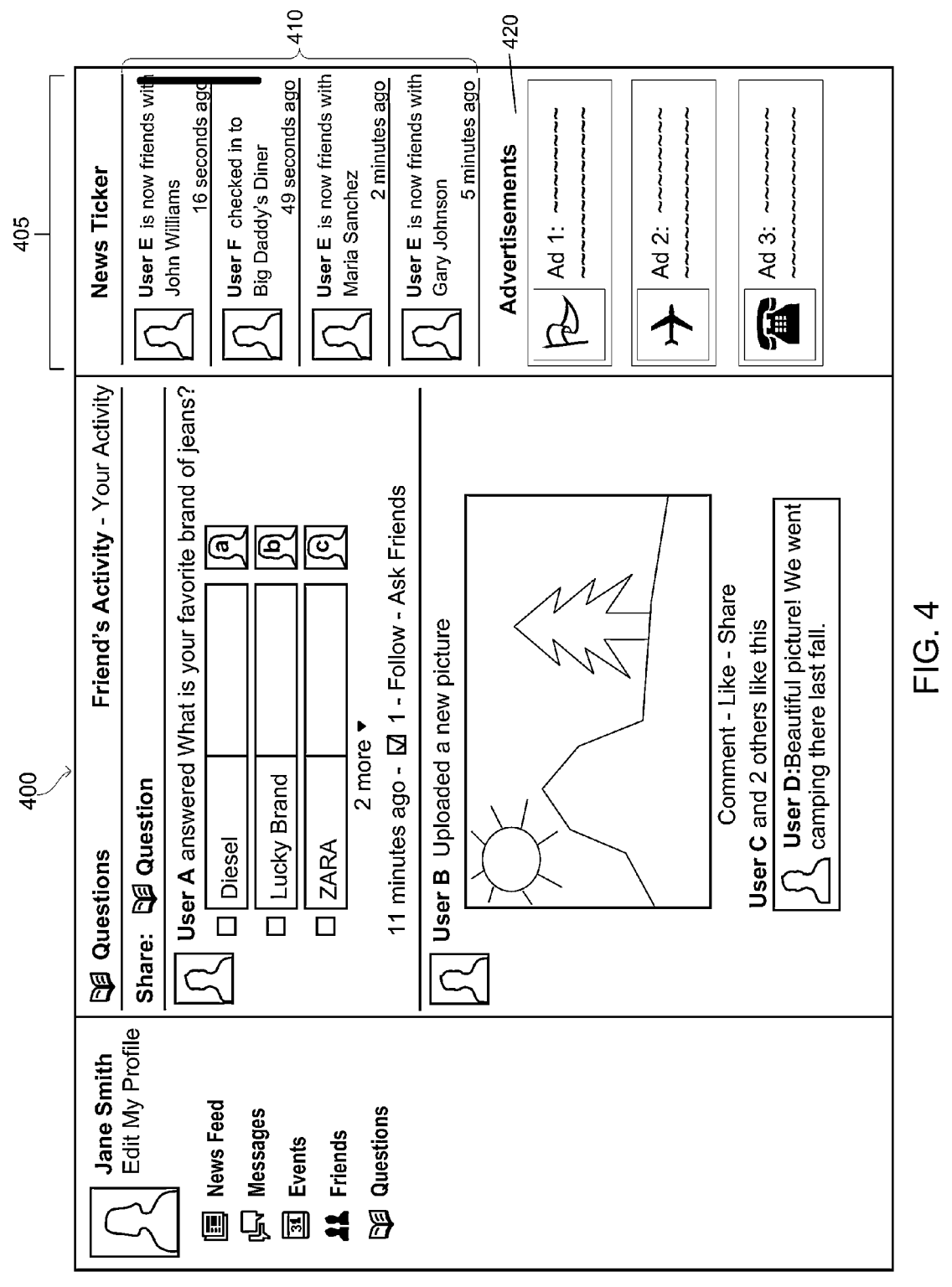

FIG. 4 is an example user interface 400 including a news ticker 405 displaying different types of content. In the example of FIG. 4, the news ticker 405 includes stories 410 and advertisements 420. As shown in FIG. 4, the news ticker 405 may display different types of content. For example, the news ticker 405 is partitioned into different sections, and different types of content may be presented in different sections. Alternatively, the news ticker 405 may display a single type of content. For example, the news ticker displays only advertisements or displays only stories. The single type of content displayed may be modified as the target user's context within the social networking system changes 110.

Figure 7:
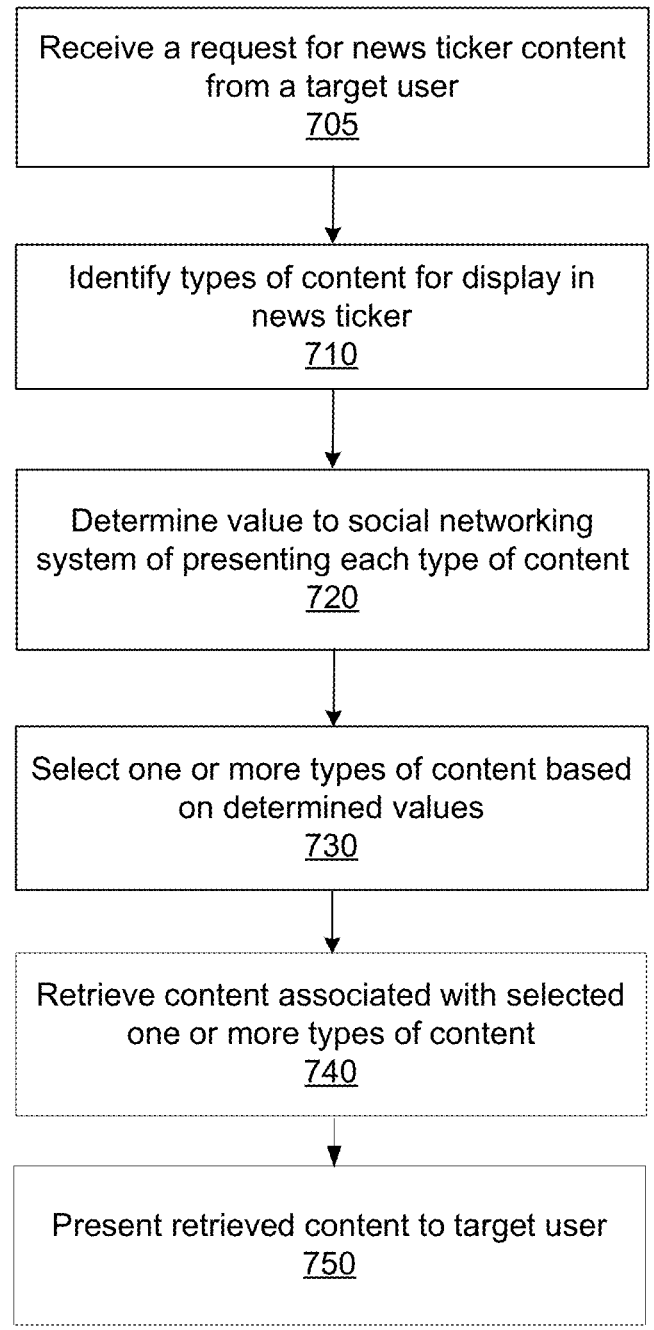
FIG. 7 is a flow chart of a process selecting types of content presented by a news ticker interface, according to one embodiment.

FIG. 7 is a flow chart of one embodiment of a process 700 for selecting types of content presented to a target user 105 of a social networking system 100 via a news ticker interface. A social networking system 100 receives 705 a request from a target user 105 for news ticker content. For example, the target user 105 requests 705 to view a news ticker or accesses a page in the social networking system 100 including a news ticker. The valuation engine 240 identifies 710 a plurality of types of content for display in the news ticker. Examples of types of content include advertisements, stories describing actions of social networking system users, surveys, questions, polls, recommendations, or any other suitable content maintained by the social networking system 100 for presentation to a target user 105.

Based at least in part on characteristics of the target user 105, the valuation engine 240 determines 720 a value to the social networking system 100 for presenting content associated with each type of content to the target user 105. For example, based on one or more of the number of users connected to the target user 105, prior interactions with content by the target user 105, content shared by the target user 105, frequency of interaction with the social networking system 100 by the target user 105, the valuation engine 240 determines an expected revenue for the social networking system 100 for displaying different types of content. Alternatively, the valuation engine 240 determines 720 an expected amount of information obtained by the social networking system 100 for displaying different types of content. In one embodiment, the valuation engine 240 converts the values to the social networking system 100 for presenting different types of content to a common unit of measurement. For example, the valuation module 240 determines 720 a revenue to the social networking system 100 for presenting advertisements, determines 720 a value of information obtained by the social networking system 100 for presenting stories, and converts the revenue and value of information to a common unit of measurement.

Based on the determined values, the valuation engine 240 selects 730 one or more types of content. For example, the valuation engine 240 selects 730 types of content having at least a threshold value or selects 730 types of content having the highest values. Content associated with each of the selected types of content is retrieved 740 and presented 750 to the user via the news ticker. In one embodiment, content associated with different types of content is presented in different portions of the news ticker. For example, advertisements are presented in one portion of the news ticker while stories are presented in a different portion of the news ticker. The portions of the news ticker for displaying different types of content may be sized proportionally to the value to the social networking system of presenting the types of content. For example, if the value of displaying advertisements to the target user 105 is larger than the value of displaying stories to the target user, a portion of the news ticker in which advertisements are displayed is larger than another portion of the news ticker in which stories are displayed. While FIG. 7 describes presentation of content in a news ticker, it may be used to select content for presentation via any suitable channel.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   sending for display to a target user of a social networking system a news ticker presenting a plurality of stories each describing an action performed by a user of the social networking system connected to the target user and identifying the user performing the action, each of the plurality of stories associated with a story type, the news ticker including stories associated with a threshold number of story types, the threshold number of story types comprising a plurality of story types, the news ticker comprising a graphical user interface;
   detecting, by an action interface module, one or more actions performed by users connected to the target user after the news ticker is sent to the target user, the action interface module configured to detect and store actions performed by users of the social networking system in real time;
   retrieving, by a news ticker computing system, candidate stories each describing a detected action performed by a user connected to the target user and each associated with a story type;
   selecting, by the news ticker computing system, a candidate story associated with a story type for inclusion in an updated news ticker such that the updated news ticker includes at least the threshold number of story types;
   without receiving an input from the target user, modifying, by the news ticker computing system, a presentation of stories within the news ticker to include the selected candidate story, to remove an existing story from the presentation of stories within the news ticker associated with the same story type as the selected candidate story, and such that the presentation of stories within the news ticker includes at least the threshold number of story types to generate the updated news ticker; and
   sending the updated news ticker including the selected candidate story for display to the target user.

2. The method of claim 1, wherein selecting the candidate story associated with a story type comprises:
   determining a number of stories from the plurality of stories included in the news ticker having a specified story type;
   selecting, by the news ticker computing system, a candidate story associated with the specified story type for inclusion in the updated news ticker such that the updated news ticker includes at least a threshold number of stories of the specified story type.

3. The method of claim 1, wherein selecting the candidate story associated with a story type comprises:
   selecting, by the news ticker computing system, a candidate story associated with a specified story type for inclusion in the updated news ticker such that the updated news ticker includes less than or equal to the threshold number of stories associated with the specified story type.

4. The method of claim 1, wherein selecting the candidate story associated with a story type comprises:
   selecting, by the news ticker computing system, a candidate story associated with a specified story type for inclusion in the updated news ticker such that the updated news ticker includes at least a threshold number of stories associated with the specified story type.

5. The method of claim 1, wherein each story type associated with a candidate story is based on the detected action described by the candidate story.

6. A method comprising:
   sending for display to a target user of a social networking system a news ticker presenting a plurality of stories each describing an action performed by a user of the social networking system connected to the target user and identifying the user performing the action, each of the plurality of stories associated with an acting user, the news ticker including stories associated with a threshold number of acting users, the threshold number of story types comprising a plurality of story types, the news ticker comprising a graphical user interface;
   detecting, by an action interface module, one or more actions performed by acting users connected to the target user after the news ticker is sent to the target user, the action interface module configured to detect and store actions performed by acting users of the social networking system in real time;
   retrieving, by a news ticker computing system, candidate stories each describing a detected action performed by an acting user connected to the target user;
   selecting, by the news ticker computing system, a candidate story associated with an acting user for inclusion in an updated news ticker such that the updated news ticker includes at least the threshold number of acting users;
   without receiving an input from the target user, modifying, by the news ticker computing system, a presentation of stories within the news ticker to include the selected candidate story, to remove an existing story from the presentation of stories within the news ticker associated with the same story type as the selected candidate story, and such that the presentation of stories within the news ticker includes at least the threshold number of story types to generate the updated news ticker; and
   sending the updated news ticker including the selected candidate story for display to the target user.

7. The method of claim 6, wherein retrieving candidate stories comprises:
   retrieving candidate stories associated with actions associated with a time within a threshold time of a current time.

8. The method of claim 6, wherein selecting the candidate story associated with an acting user comprises:
   determining, by the news ticker computing system, affinity between the target user and the acting user associated with the candidate story; and
   selecting, by the news ticker computing system, the candidate story for inclusion in an updated news ticker based on the affinity.

9. The method of claim 8, wherein selecting the candidate story based on the affinity comprises:
   selecting, by the news ticker computing system, the candidate story associated with the acting user associated with at least a threshold affinity for inclusion in the updated news ticker.

10. The method of claim 8, wherein selecting the candidate story based on the affinity comprises:
  selecting, by the news ticker computing system, the candidate story associated with the acting user associated with a highest affinity for inclusion in the updated news ticker.

11. The method of claim 6, wherein selecting the candidate story associated with an acting user comprises:
  selecting, by the news ticker computing system, a candidate story associated with an acting user different than users of the social networking system associated with the plurality of stories.

12. A method comprising:
  sending for display to a target user of a social networking system a news ticker presenting a plurality of stories each describing an action performed by a user of the social networking system connected to the target user and identifying the user performing the action, each of the plurality of stories associated with an action, the news ticker including stories associated with a threshold number of actions, the threshold number of story types comprising a plurality of story types, the news ticker comprising a graphical user interface;
  detecting, by an action interface module, one or more actions performed by acting users connected to the target user after the news ticker is sent to the target user, the action interface module configured to detect and store actions performed by acting users of the social networking system in real time;
  retrieving, by the news ticker computing system, candidate stories each describing a detected action performed by an acting user connected to the target user;
  selecting, by the news ticker computing system, a candidate story associated with an action for inclusion in an updated news ticker such that the updated news ticker includes at least the threshold number of actions;
  without receiving an input from the target user, modifying, by the news ticker computing system, a presentation of stories within the news ticker to include the selected candidate story, to remove an existing story from the presentation of stories within the news ticker associated with the same story type as the selected candidate story, and such that the presentation of stories within the news ticker includes at least the threshold number of story types to generate the updated news ticker; and
  sending the updated news ticker including the selected candidate story for display to the target user.

13. The method of claim 12, wherein selecting the candidate story associated with an action comprises:
  selecting, by the news ticker computing system, a candidate story associated with a specified action for inclusion in the updated news ticker such that no story of the plurality of stories is associated with the specified action.

14. The method of claim 12, wherein selecting the candidate story associated with an action comprises:
  selecting, by the news ticker computing system, a candidate story associated with an action having a specified type such that at least a threshold number of types of actions are associated with stories included in the updated news ticker.

15. The method of claim 12, wherein selecting the candidate story associated with an action comprises:
  determining, by the news ticker computing system, affinity between the target user and the acting user associated with the candidate story; and
  selecting, by the news ticker computing system, the candidate story for inclusion in an updated news ticker based on the action associated with the candidate story and the affinity.

16. The method of claim 15, wherein selecting the candidate story based on the action associated with the candidate story and the affinity comprises:
  selecting, by the news ticker computing system, a candidate story associated with an acting user associated with at least a threshold affinity.

17. The method of claim 15, wherein selecting the candidate story based on the action associated with the candidate story and the affinity comprises:
  selecting, by the news ticker computing system, a candidate story associated with an action having a specified type;
  responsive to the plurality of stories presented by the news feed including at least a threshold number of stories describing the specified type of action, determining, by the news ticker computing system, whether an affinity associated with an acting user associated with the selected candidate story is at least a threshold affinity; and
  responsive to the affinity associated with the acting user associated with the selected candidate story being at least a threshold affinity, including, by the news ticker computing system, the selected candidate story in the updated newsfeed.

* * * * *